United States Patent [19]
Derringer

[11] Patent Number: 4,627,391
[45] Date of Patent: Dec. 9, 1986

[54] ENGINE VALVE TRAIN SYSTEM

[75] Inventor: John G. Derringer, Flint, Mich.

[73] Assignee: General Motors Corporation, Detroit, Mich.

[21] Appl. No.: 685,459

[22] Filed: Dec. 24, 1984

[51] Int. Cl.⁴ .......................... F02D 13/06; F01L 1/34
[52] U.S. Cl. .............................. 123/90.16; 123/198 F; 123/432; 123/90.39
[58] Field of Search ...................... 123/308, 432, 90.16, 123/198 F, 90.39, 90.48

[56] References Cited

U.S. PATENT DOCUMENTS

| | | | |
|---|---|---|---|
| 4,220,122 | 9/1980 | Aoyama | 123/90.55 |
| 4,256,070 | 3/1981 | Mueller | 123/90.16 |
| 4,469,061 | 9/1984 | Ajiki | 123/90.16 |
| 4,480,617 | 11/1984 | Nakano | 123/432 |
| 4,492,192 | 1/1985 | Bagoelin | 123/198 F |
| 4,523,550 | 6/1985 | Matsuura | 123/90.16 |
| 4,537,164 | 8/1985 | Ajiki | 123/90.16 |
| 4,537,165 | 8/1985 | Honda | 123/90.16 |

FOREIGN PATENT DOCUMENTS

| | | | |
|---|---|---|---|
| 524841 | 12/1953 | Belgium | 123/90.39 |
| 1275328 | 5/1972 | United Kingdom | 123/90.16 |

OTHER PUBLICATIONS

Automotive Engineering, vol. 92, No. 2, Feb. 1984, pp. 86-89, Dallas Texas, US.

J. Yamaguchi: "Variable Valve Area Improves Breathing" p. 86, line 16-p. 87, line 18, Figures 2-3.

*Primary Examiner*—Carl Stuart Miller
*Attorney, Agent, or Firm*—Arthur N. Krein

[57] ABSTRACT

An engine valve train system for selectively effecting operation of a pair of side by side valves of a cylinder and to effect deactivation of one of the valves in the pair during predetermined modes of engine operation includes first and second rocker arms pivotably supported on a hollow rocker shaft which in turn is suitably supported for pivotable movement between an operative position and an idle or inoperative position and which is connected to a source of pressurized hydraulic fluid. The first rocker arm is adapted to be driven by an actuator to effect opening and closing movement of one of the valves. The second rocker arm has a hydraulic cylinder and piston means which, when the rocker shaft is in the operative position, is supplied with hydraulic fluid whereby to extend the piston to operatively connect the second rocker arm with the first rocker arm so as to be also operated thereby whereby to effect opening and closing movement of the other one of the valves and when the rocker shaft is in the idle or inoperative position, hydraulic fluid can drain from the hydraulic cylinder and piston means whereby the second rocker arm becomes inoperative to effect opening movement of the other one of the valves.

3 Claims, 6 Drawing Figures

ENGINE VALVE TRAIN SYSTEM

This application relates to valve train systems for internal combustion engines and, in particular, to a valve train system for selectively effecting operation of a pair of side by side valves and to effect deactivation of one of the valves in the pair during predetermined modes of engine operation.

DESCRIPTION OF THE PRIOR ART

Various devices are known in the art to deactivate valves for selected cylinders of an internal combustion engine in order to improve fuel economy during certain modes of engine operation. It is also well known in the art to provide each of the cylinders of an internal combustion engine with plural intake and exhaust valves, that is, either with two inlet valves and one exhaust valve or with two inlet valves and two exhaust valves per cylinder in order to improve engine efficiency at high loads and operational speeds of the engine.

However, the desirability of reducing air intake flow at idle or low engine speeds in such engines having multiple valves per cylinder in order to provide for proper mixing of the incoming air fuel combustion charge and to obtain the desired air fuel mixture has been recognized and, accordingly, various devices have been proposed so as to restrict such air flow either by the use of suitable valve means in the intake manifold whereby, for example to limit air flow to the pair of operating intake valves or by a suitable apparatus to deactivate one of the valves in the pair of such valves associated with each cylinder.

SUMMARY OF THE INVENTION

The present invention relates to an engine valve train system by which a pair of valves, such as a pair of intake valves, associated with a cylinder are driven by first and second rocker arms pivotably supported by a tubular rocker shaft mounted for pivotable movement between first and second positions by a suitable actuator means as a function of engine operation. The first rocker arm has a driven portion adapted to be engaged by an actuator, such as a cam on the engine camshaft, and a drive portion adapted to engage one of the valves while the second rocker arm has a drive portion adapted to engage the other valve of the pair of valves and has a hydraulic cylinder and piston associated therewith whereby the second rocker arm can be operatively connected to the first rocker arm so as to be actuated thereby or, it can be operatively disconnected from said first rocker arm. The rocker shaft is provided with a supply passage including radial port means for pressurized hydraulic fluid arranged so that hydraulic fluid can be supplied to the hydraulic cylinder of the second rocker arm when the rocker shaft is in the first position so that the second rocker arm is active as thus fixed by the hydraulic cylinder and piston to the first rocker arm, and the rocker shaft is also provided with an external drain groove located so that when the rocker shaft is in the second position, hydraulic fluid can drain from the hydraulic cylinder whereby the associate piston can retract so that the second rocker arm becomes inactive.

It is therefore a primary object of this invention to provide an improved valve train system for use with two valves, such as two side by side intake valves, per cylinder of an internal combustion engine, which includes a first rocker arm supported for oscillating movement on a tubular rocker shaft that is pivotably supported for movement between first and second positions, and which driven, as by a cam, to effect operation of one of the valves and a second rocker arm pivotably supported on the rocker shaft to control operation of the other valve, the second rocker arm being provided with a hydraulic cylinder/piston means, whereby when the rocker shaft is in the first position a pressurized hydraulic supply means in the rocker shaft is adapted to supply hydraulic fluid to the hydraulic cylinder so as to effect movement of the associate piston into operative engagement with the first rocker arm whereby the second rocker arm will be actuated thereby and, when the rocker shaft is in the second position, hydraulic fluid can drain from the hydraulic cylinder to effect deactivation of the second rocker arm.

Another object of the invention is to provide an improved valve train system for use with two side by side associated valves in a three or four valve per cylinder engine, the valve train system having a tubular rocker shaft with passage means and drain means associated therewith that is pivotably supported for movement between an operative position and an idle or inoperative position, first and second rocker arms pivotably supported by the rocker shaft in operative relationship to a pair of associated valves, such as the intake valves for a cylinder, the first rocker arm being adapted to be actuated, as by a cam, to effect operation of one of the valves, the second rocker arm, associated with the other valve, having a hydraulic cylinder and piston means associated therewith whereby when the rocker arm is in the operative position hydraulic fluid will effect operation of the piston so as to operatively connect the second rocker arm to the first rocker arm for oscillation therewith and when the rocker shaft is in the idle or inoperative position, hydraulic fluid can drain from the hydraulic cylinder to effect deactivation of the second rocker arm.

A still further object of the invention is to provide an improved valve train system for use with a pair of associated valves (intake or exhaust) for the cylinder of an engine wherein one of the valves is actuated by a cam actuated rocker arm and the other valve is actuated or is inactivated by means of a second rocker arm which has a hydraulic cylinder and piston means associated therewith whereby this second rocker arm can be selectively operatively connected to or disconnected from the cam actuated rocker arm.

For a better understanding of the invention as well as other objects and further features thereof, reference is had to the following detailed description of the invention to be read in connection with the accompanying drawings.

DESCRIPTION OF THE PREFERRED EMBODIMENT

Figure 1:
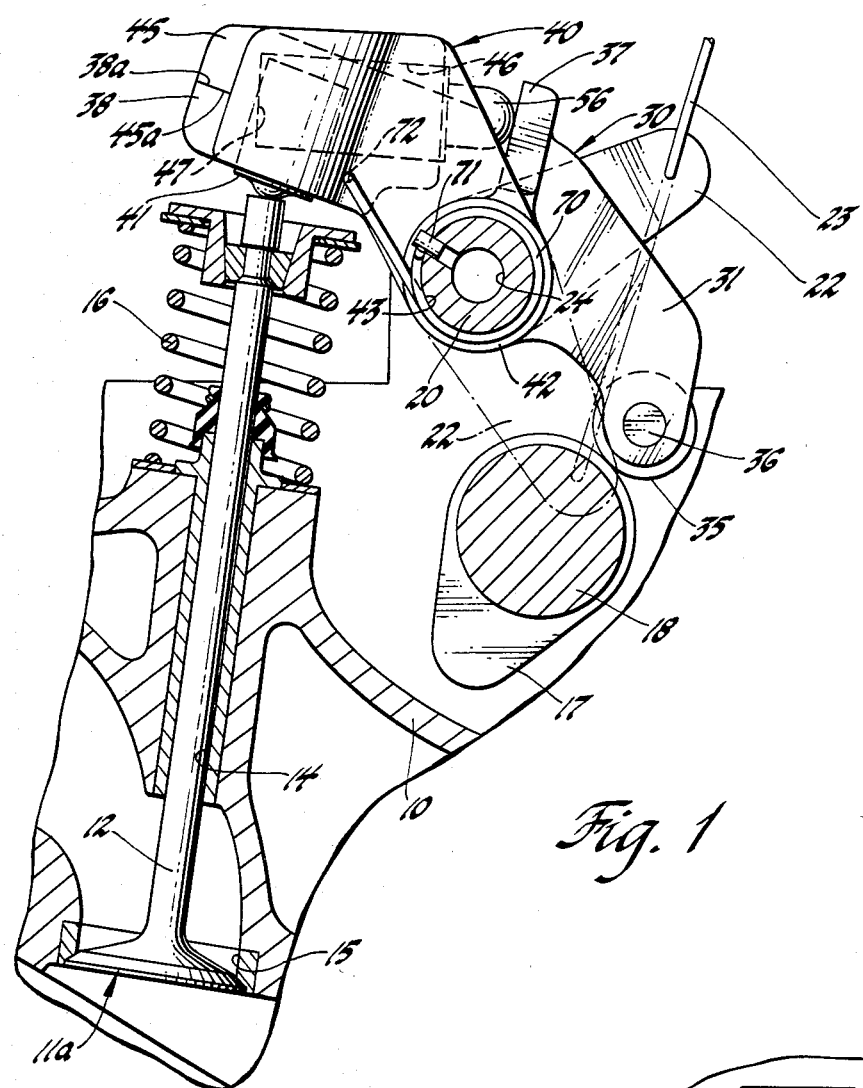
FIG. 1 is a cross-sectional view of a portion of an internal combustion engine having a valve train system in accordance with the invention incorporated therein to control the operation of a pair of side by side valves associated with a cylinder of the engine, the elements being shown with the rocker shaft positioned whereby the rocker arms are interconnected so as to effect operation of both valves.
Figure 2:
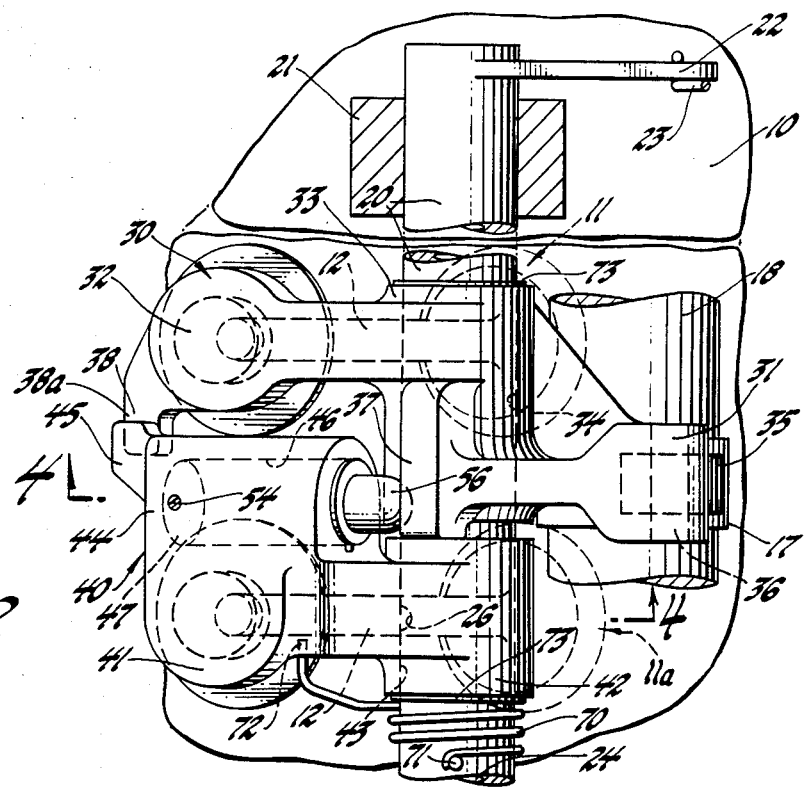
FIG. 2 is a top view of the portion of the engine shown in FIG. 1 illustrating the operating arrangement of the rocker arms of the valve train with their respective valves.

Referring first to FIGS. 1 and 2, there is illustrated, for purpose of illustration only, a portion of an engine which includes a cylinder head 10 which, in a conventional manner, is fixed to a cylinder block so as to define therewith a combustion cylinder, both not shown. In the construction shown, a pair of side by side intake valves 11, 11a, in the form of poppet valves, are operatively associated with the cylinder. Each poppet valve 11, 11a has a stem 12 which is reciprocably supported in an associate valve guide bore 14 in the cyinder head 10 for movement to open or close an associate port 15, which can be either an exhaust port or an inlet port as in the construction shown. Each of the poppet valves 11, 11a is normally biased to its closed position, the position shown in FIG. 1, by a valve return spring 16 in a conventional manner.

In accordance with the invention, the pair of side by side poppet valves 11, 11a, in the embodiment shown, are operated by a cam 17 on a camshaft 18 via first and second rocker arms 30 and 40, respectively, to be described in detail hereinafter, that are pivotably supported by a rocker shaft 20. The rocker shaft 20 is axially secured and pivotably supported above the cylinder head 10, as by bearings 21 mounted in suitably spaced apart conventional brackets, not shown, only one such bearing 21 being shown in FIG. 2. As best seen in FIG. 2, the rocker shaft 20 has fixed at one end thereof suitable means, such as the lever arm 22 shown whereby the rocker shaft 20 can be pivoted by a suitable manual or electrical operated computer controlled actuator rod 23, as a function of engine operation between an active position and an idle or inactive position, as best seen in FIGS. 1, 3, 4 and 5.

Figure 4:
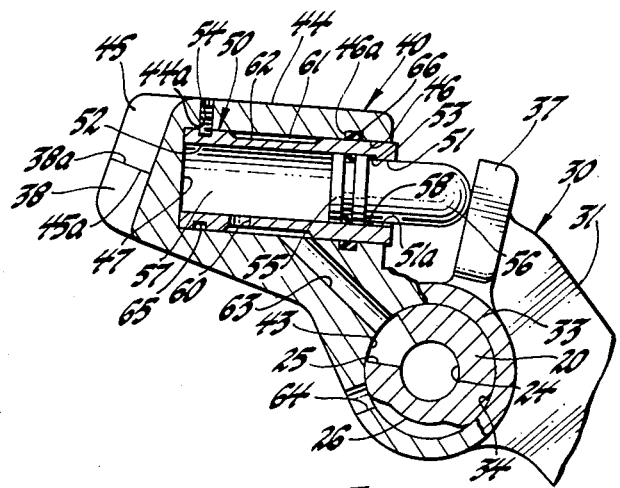
FIGS. 4 and 5 are views of the rocker arms per se of FIG. 1 taken along the line 4—4 of FIG. 2, so that the second rocker arm is illustrated in cross section to show the hydraulic cylinder and piston arrangement thereof, in the operative and inoperative modes, respectively; and, FIG. 6 is a view similar to FIG. 4 but showing an alternate embodiment of the second rocker arm which has an alternate embodiment of a hydraulic cylinder and piston associated therewith.
Figure 5:
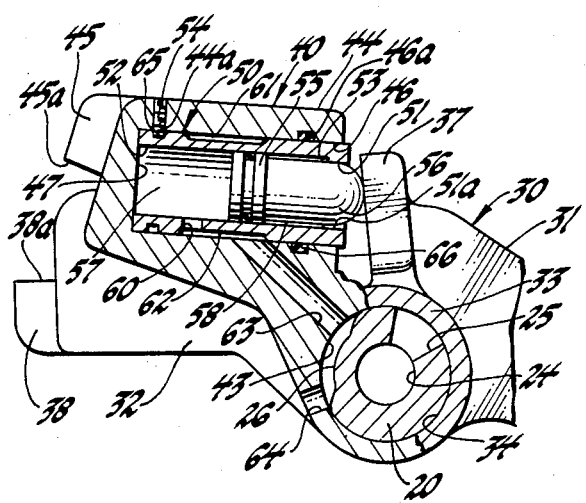

The rocker shaft 20 is provided with an axial extending passage 24 which is in continuous communication with a pressurized source of hydraulic fluid such as the pressurized lubricant oil supply of the engine through suitable interconnecting passage means, not shown, and the rocker shaft 20 is also provided with a through radial port 25, as best seen in FIGS. 4 and 5, for each pair of rocker arms each such port extending from the passage 24 to the outer peripheral surface of the rocker arm in an axial location relative to the second rocker arm 40 for a purpose to be described in detail hereinafter and with conventional riser passages, not shown, to effect lubrication for the first rocker arms 30. In addition, the rocker shaft 20 is also provided on the exterior thereof with a corresponding number of narrow chordal grooves 26, each such groove being in circumferential alignment with an associate port 25 for a purpose to be also described in detail hereinafter.

Referring now to the rocker arm 30, it is provided with opposed driven and drive arms 31 and 32, respectively, overlying the cam 17 on camshaft 18 and the free end of the stem 12 of the first poppet valve 11, respectively, and it is also provided with an intermediate pivot portion 33 having a transverse bearing bore 34 extending therethrough of a suitable predetermined internal diameter to receive the rocker shaft 20 whereby this rocker arm 30 is pivotably supported by the rocker shaft. In a conventional manner, the rocker shaft 20 is provided, as previously described, with at least one radial riser passage, not shown, extending from the passage 24 so as to effect lubrication of the bearing surfaces associated with the rocker shaft 20 and each rocker arm 30.

As best seen in FIG. 2, the drive arm 32 and the driven arm 31 extend outward in opposite directions from opposite ends of the intermediate pivot portion 33, with the driven arm 31 being bifurcated at its free end to receive a cam follower roller 35 rotatably journaled by a follower shaft 36 suitably fixed to the bifurcated end of the driven arm 31 whereby the cam follower roller 35 can ride on the associate cam 17.

Figure 3:
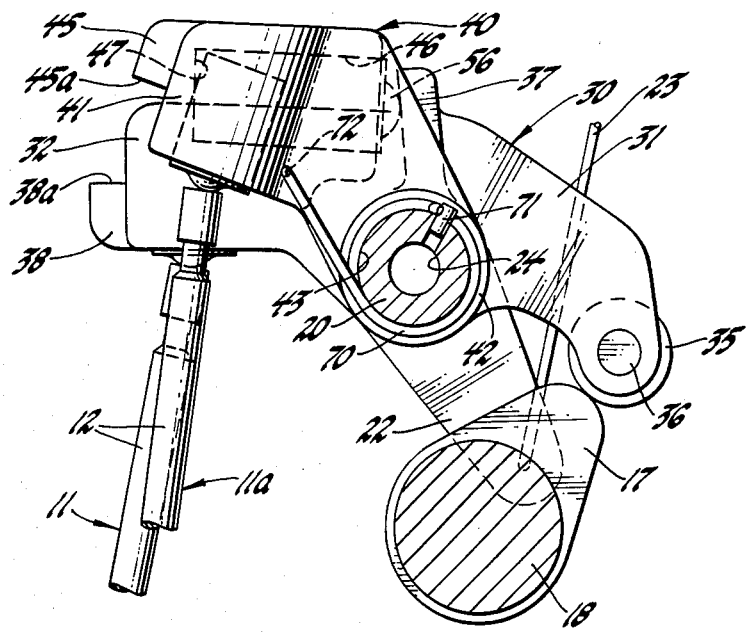
FIG. 3 is a view similar to a portion of FIG. 1, but showing the rocker shaft moved to an idle position so as to effect deactivation of one of the rocker arms whereby to also effect deactivation of the associate valve, the valve return springs not being shown, so that the operation of one valve and the deactivation of the other valve could be more clearly illustrated.

The driven arm 32 at its opposite end is provided with an abutment arm 37 that extends radially outward from the main body of the intermediate pivot portion 33 for a purpose to become apparent hereinafter. In addition, in the embodiment shown in FIGS. 1–5, the free end of the drive arm 32 of rocker arm 30 is provided with a lateral outward extending stop member 38 having a flat upper surface 38a, as best seen in FIGS. 3 and 4 for a purpose to be described hereinafter.

With reference now to the rocker arm 40, it includes a drive arm 41 portion overlying the free end of the stem 12 of the second poppet valve 11a and a pivot portion 42 having a transverse bearing bore 43 extending therethrough of an internal diameter to also receive the rocker shaft 20 whereby this rocker arm 40 is pivotably supported by the rocker shaft 20 in a location next adjacent to the rocker arm 30 on the driven arm portion 32 thereof, as best seen in FIG. 2, so that the rocker arm 40 can be selectively coupled to or uncoupled from the rocker arm 30 by means of a suitable hydraulic cylinder and piston arrangement whereby rocker arm 40 can be driven, that is, oscillated, by operation of rocker arm 30 during predetermined modes of engine operation or it can be rendered inoperative so as to allow poppet valve 11a to remain closed.

For this purpose and as best seen in FIGS. 2, 4 and 5, the drive arm 41 portion of rocker arm 40 is also provided with an integral lateral hydraulic housing portion 44 and with a lateral outward extending stop member 45 having a flat lower surface 45a opposed to but aligned with the stop member 38 of rocker arm 30. As shown the housing portion 44 of each rocker arm 40 is provided with a blind bore to define an internal circular wall 46 that extends from the pivot portion 42 side thereof to terminate at a base wall 47, as best seen in FIGS. 4 and 5.

A hydraulic bushing or cylinder 50, in the form of a tubular sleeve, is suitably sealingly secured in the bore wall 46 so as to abut against base wall 47. In the construction shown, the hydraulic cylinder 50 is provided with an axial stepped through bore to define, starting from the outboard end thereof, a circular outer guide wall 51 and an inner cylinder wall 52 of an internal diameter greater than that of guide wall 51, with these walls being interconnected by a flat shoulder 53.

A hydraulic piston 55 is sealingly and slidably received by the cylinder wall 52 and this piston 55 is provided with a reduced diameter rod 56 portion which is guidingly received by the guide wall 51. The piston with its reduced diameter rod 56 portion is of a suitable axial extent whereby when the piston 55 is acted upon by pressurized hydraulic fluid, the free end of rod 56 portion thereof will abut against the opposed surface of the abutment arm 37 of rocker arm 30 so as to, in effect, cause the rocker arm 40 to pivot in a direction relative to the rocker arm 30, as from the position shown in FIGS. 3 and 5, to a position at which the opposed surfaces 38a and 45a of the stop members 38 and 45 on rocker arms 30 and 40, respectively, are in abutment against each other, the position shown in FIGS. 1 and 4, at which time the rocker arm 40 is operatively coupled to the rocker arm 30 so as to be driven thereby during operation of rocker arm 30.

As illustrated, the body of the piston 55 at its inboard end forms with the cylinder wall 52 a hydraulic working chamber 57 and at its outboard end a cavity 58 that is preferably in communication with the atmosphere, as by means of an axial extending groove 51a provided for this purpose in the guide wall 51.

Flow of hydraulic fluid to and from the hydraulic working chamber 57, in the construction shown, is by means of one or more radial ports 60 provided in the hydraulic cylinder 50 so as to communicate with an annulus chamber 61 defined by the bore wall 46 and an annular groove 62 formed in the outer peripheral surface of the hydraulic cylinder 50. This annulus chamber 61 is axially located so as to be in flow communication with one end of an inclined passage 63 provided in the rocker arm 40, the opposite end of this passage 63 opens through the bearing bore 43 wall at a location so as to be in substantial alignment with the associate port 25 and chordal groove 26 in the rocker shaft 20. Accordingly, when the rocker shaft 20 is rotated to its operative position, the position shown in FIGS. 1 and 4, the passage 63 will be in flow communication with the associate port 25 whereby pressurized hydraulic fluid will be supplied to the hydraulic working chamber, and when the rocker shaft 20 is rotated to its inoperative or idle position, the position shown in FIGS. 3 and 5, the passage 63 will be in flow communication via the associate chordal groove 26 with a drain passage or port 64 provided in the lower portion of the pivot portion 42 of the rocker arm 40.

In the construction shown, the hydraulic cylinder 50 is axially retained in the bore wall 46 of the rocker arm 40 by means of a set screw 54 threadingly received in an internally threaded aperture 44a provided in the hydraulic housing portion 44 thereof at a location so that the inboard end of the set screw 54 will be received in an annular groove 65 suitably located on the outer peripheral surface of the hydraulic cylinder 50. In addition an O-ring seal 66 is positioned in an annular groove 46a provided for this purpose in the bore wall 46 to effect a fluid seal between this bore wall and the outer peripheral surface of the hydraulic cylinder 50.

As best seen in FIGS. 1–3, a coiled torsion spring 70, of predetermined force, is positioned to encircle the rocker shaft 20 and has one end thereof secured to a pin 71 fixed in a suitable aperture provided in the rocker shaft 20, the opposite end of the spring 70 extending into an aperture 72 provided in the side of the drive arm 41 of the rocker arm 40, whereby the drive arm 41 is normally biased into engagement with the free end of the stem 12 of valve 11a even when the rocker arm 40 is in a deactivated mode, as shown in FIG. 3.

Suitable means are also operatively associated with the rocker arms 30, 40 whereby to maintain their axial position on the rocker shaft 20 for the desired operative relationship with the associate poppet valves 11, 11a, respectively. For this purpose in the construction shown and as best seen in FIG. 2, the rocker arms 30, 40 are retained against axial movement relative to the rocker shaft 20 by means of conventional split ring retainers 73 positioned in suitable annular grooves provided for this purpose in the outer peripheral surface of the rocker shaft for each pair of rocker arms 30 and 40.

FUNCTIONAL DESCRIPTION

As should now be apparent, during engine idle operation and up to a desired predetermined engine speed, the lever arm 22 would be suitably actuated so as to rotate the rocker shaft 20 to the idle or inoperative position, the position shown in FIGS. 3 and 5, at which the port 25 in the rocker shaft 20 is moved to a position out of fluid communication with the passage 63, this passage 63 then being in flow communication with the drain port 64 in rocker arm 40 via chordal groove 26.

In this position of the rocker shaft 20, if the hydraulic piston 55, with its rod 56, is in an outward extended position, the position shown for example in FIG. 4, then during the next rotative cycle of the camshaft 18, the rocker arm 30 would be pivoted so as to effect opening movement of the poppet valve 11. As this occurs, the abutment arm 37 on the rocker arm 30 engaging the end of rod 56 would force the hydraulic piston 55 axially inward from the position shown in FIG. 4 to the position shown in FIG. 5, forcing the hydraulic fluid in the hydraulic working chamber 57 to be discharged via port 60, annular chamber 61, passage 63, and the passage defined by chordal groove 26 out through the drain port 65 so that in effect the pressure of the fluid then remaining in the hydraulic working chamber 57 would be at substantially atmospheric pressure. With the hydraulic piston 55 thus retracted, the rocker arm 40 is, in effect, uncoupled from rocker arm 30 and its drive arm 41 will merely abut against the free end of the stem 12 of poppet valve 11a, as biased by the torsion spring 70. Accordingly, poppet valve 11a will remain closed by the force of its associated valve return spring 16.

Since in the construction shown, the poppet valves 11, 11a have been identified as inlet valves, it should be apparent that during this inoperative mode, the entire induction charge will flow rapidly through the port 15 associated with the operating poppet valve 11 into the associate cylinder, not shown, to thereby produce a turbulent air fuel mixture which is a prerequisite for good combustion and efficient gas mileage at low speeds.

At a predetermined higher engine speed, lever arm 22 would then be actuated so as to rotate the rocker shaft 20 to the operative position, the position shown in FIGS. 1 and 4, at which the port 25 in the rocker shaft 20 is then in flow communication with the passage 63 so that the hydraulic working chamber 57 will then be supplied with pressurized hydraulic fluid. As this occurs, this pressurized hydraulic fluid acting against the inboard end of the piston 55 will effect axial movement thereof, as from the position shown in FIG. 5 to that shown in FIG. 4, so that the free end of its rod 56 will be in continual abutment against the abutment arm 37 of rocker arm 30 so that the rocker arm 40 is then operatively connected to rocker arm 30 to oscillate therewith as rocker arm 30 is actuated by the associate cam 17 during rotation of the camshaft whereby both poppet valves 11 and 11a will then be operative to permit more of an air induction charge to be drawn into the associate combustion cylinder, not shown.

Figure 6:
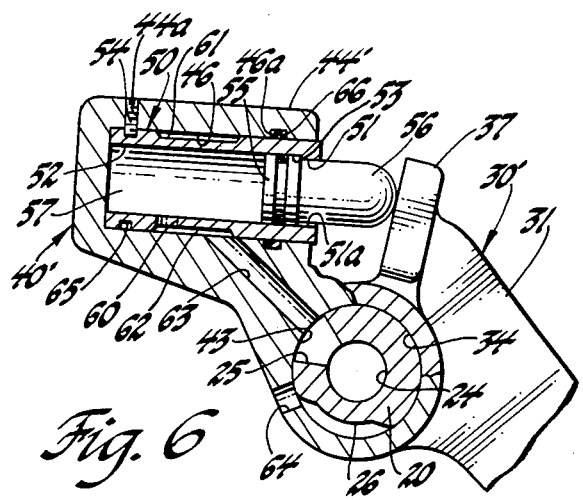

An alternate embodiment of a pair of rocker arms for use in an engine valve train system in accordance with the invention is shown in FIG. 6 wherein similar parts are designated by similar numerals but with the addition of a prime (') where appropriate.

In this alternate embodiment, the axial extent of the rod 56 of the hydraulic piston 55 is preselected so that when the rocker shaft 20 is rotated to the operative position, the hydraulic piston 55 will be forced by the pressurized hydraulic fluid in the hydraulic working chamber 57 into abutment against the internal flat shoulder 53 of the hydraulic cylinder 50 with its rod 56 then extending into abutment against the abutment arm 37 of the rocker arm 30' to thus fix the angular position of rocker arm 40' relative to rocker arm 30' so as to be driven thereby. This thus eliminates the need for stop members, such as the stop members 38 and 45 used on the rocker arms 30 and 40, respectively in the embodiment of these rocker arms shown in FIGS. 1-5.

While the invention has been described with reference to the structures disclosed herein, it is not confined to the specific details set forth, since it is apparent that modifications and changes can be made by those skilled in the art. This application is thereby intended to cover such modifications or changes as may come within the purposes of the improvements or scope of the following claims.

The embodiments of the invention in which an exclusive property or privilege is claimed are defined as follows:

1. A reciprocating internal combustion engine of the type having an engine block means defining at least one cylinder with an associate pair of ports, a valve located for axial movement in each of said ports with each said valve normally biased to a valve closed position relative to its associate port, rocker shaft support means fixed to said engine block means, and a valve actuator spaced from said valves and operable to effect reciprocation of said valves, the improvement comprising: a rocker shaft pivotably supported by said rocker shaft support means, said rocker shaft having an axial passage adapted to be in continuous flow communication with the pressurized lubricant supply of the engine; a first rocker arm pivotably supported on said rocker shaft in position for engagement with said valve actuator and with one of said valves and actuated in rocking movement whereby it can operate to effect opening and closing movement of said one of said valves, and a second rocker arm pivotably supported on said rocker shaft next adjacent to said first rocker arm and operatively engaging the other one of said valves, said second rocker arm having a hydraulic cylinder means therein, a piston sealingly journaled in said hydraulic cylinder means and located so as to permit engagement of said piston with said first rocker arm, said second rocker arm having a supply/drain passage means therein to said hydraulic cylinder means, and a drain passage which extends to the exterior of said second rocker arm and which is located in circumferentially spaced apart relationship to said supply/drain passage means, said rocker shaft having at least one radial riser supply passage in flow communication with said axial passage and a chordal exterior drain groove circumferentially spaced from said supply passage both said radial riser supply passage and said chordal exterior drain groove being axially located on said rocker shaft so as to be in radial alignment with said supply/drain passage means and with said drain passage in said second rocker arm; and, drive means operatively connected to said rocker shaft to effect pivotable movement thereof between a first position at which said supply passage is in flow communication with said supply/drain passage means whereby pressurized lubricant can be supplied to said hydraulic cylinder to effect movement of said piston in a direction whereby said second rocker arm will be operatively driven by said first rocker arm, and a second position at which said supply passage is out of flow communication with said supply/drain passage means and said drain groove is in a position to effect flow communication between said supply/drain passage means and said drain passage whereby said second rocker arm will be operatively disconnected from said first rocker arm.

2. A reciprocating internal combustion engine of the type having an engine block means defining at least one cylinder having an associate pair of ports, a valve located for axial movement in each of said ports with each said valve normally biased to a valve closed position relative to its associate port, rocker shaft support means fixed to said engine block means, and a valve actuator spaced from said valves and operable to effect reciprocation of said valves, the improvement comprising: a hollow rocker shaft pivotably supported by said rocker shaft support means, said rocker shaft having an axial passage adapted to be in continuous flow communication with the pressurized lubricant supply of the engine; a first rocker arm pivotably supported on said rocker shaft in position for engagement with said valve actuator and with one of said valves whereby it can operate to effect opening and closing movement of said one of said valves, a second rocker arm having a bearing bore extending transversely therethrough by means of which said second rocker arm is pivotably supported by said rocker shaft and having a driven arm portion operatively engaging the other one of said valves, said second rocker arm having a hydraulic cylinder means therein, a piston journaled for axial movement in said cylinder means and having a rod portion thereof adapted to engage said first rocker arm, said second rocker arm having a supply/drain passage means therein which extends from said bearing bore therein to said hydraulic cylinder means, and a drain passage which extends from said bearing bore to the exterior of said second rocker arm and which is located in circumferentially spaced apart relationship to said supply/drain passage means, said rocker shaft having at least one radial riser supply passage in flow communication with said axial passage and a chordal exterior drain groove circumferentially spaced from said supply passage, said supply passage and said drain groove being axially located on said rocker shaft so as to be in radial alignment with said supply/drain passage means and with said drain passage in said second rocker arm; and, drive means operatively connected to said rocker shaft to effect pivotable movement thereof between a first position at which said supply passage is in flow communication with said supply/drain passage means whereby pressurized lubricant can be supplied to said hydraulic cylinder means to effect movement of said piston in a direction whereby said second rocker arm will be operatively driven by said first rocker arm, and a second position at which said supply passage is out of flow communication with said supply/drain passage means and said drain groove is in a position to effect flow communication between said supply/drain passage means and said drain passage whereby said second rocker arm will be operatively disconnected from said first rocker arm.

3. A reciprocating internal combustion engine of the type having an engine block means defining at least one cylinder with a pair of side by side ports associated therewith, with each such port having a valve located for axial movement relative thereto with each said valve being normally biased to a valve closed position relative to its associate port, rocker shaft support means fixed to said engine block means, and a valve actuator spaced from said valves and operable to effect reciprocation of said valves, the improvement comprising: a rocker shaft pivotably supported by said rocker shaft support means, said rocker shaft having an axial passage adapted to be in continuous flow communication with the pressurized lubricant supply of the engine; a rocker arm means pivotably supported by said rocker shaft in position for engagement with said valve actuator and with said valves, said rocker arm means including a first rocker arm having a bearing bore extending transversely therethrough receiving said rocker shaft, a drive arm portion operatively engaged by said valve actuator and a first driven arm portion operably engaging one of said valves, and a second rocker arm having a bearing bore extending transversely therethrough by means of which said second rocker arm is pivotably supported by said rocker shaft and having a second driven arm portion operatively engaging the other one of said valves, said second rocker arm having a hydraulic cylinder means therein, a piston means journaled for axial movement in said cylinder means and having a rod portion adapted to engage said first rocker arm, said second rocker arm having a supply drain passage means therein which extends from said bearing bore therein to said hydraulic cylinder means, and a drain passage which extends from said bearing bore to the exterior of said second rocker arm and which is located in circumferentially spaced apart relationship to said supply/drain passage means, said rocker shaft having at least one radial riser supply passage in flow communication with said axial passage and an adjacent chordal exterior drain groove circumferentially spaced from said supply passage, said radial riser supply passage and said chordal exterior drain groove being axially located on said rocker shaft so as to be in radial alignment with said supply/drain passage means and with said drain passage on said second rocker arm; and, drive means operatively connected to said rocker shaft to effect pivotable movement thereof between a first position at which said supply passage is in flow communication with said supply/drain passage means whereby pressurized lubricant can be supplied to said cylinder to effect movement of said piston in a direction whereby said second rocker arm will be operatively driven by said first rocker arm, and a second position at which said supply passage is out of flow communication with said supply/drain passage means and said drain groove is in a position to effect flow communication between said supply/drain passage means and said drain passage whereby said second rocker arm will be operatively disconnected from said first rocker arm.

* * * * *